(12) United States Patent
Jaros et al.

(10) Patent No.: US 7,131,583 B2
(45) Date of Patent: *Nov. 7, 2006

(54) SYSTEMS, METHODS, AND APPARATUS FOR INSTANT ISSUANCE OF A CREDIT CARD

(75) Inventors: Richard J. Jaros, Glen Allen, VA (US); Monique J. Steadman, Alexandria, VA (US)

(73) Assignee: Capital One Financial Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/098,403

(22) Filed: Apr. 5, 2005

(65) Prior Publication Data

US 2005/0173520 A1    Aug. 11, 2005

Related U.S. Application Data

(63) Continuation of application No. 09/694,791, filed on Oct. 24, 2000, now Pat. No. 6,877,656.

(51) Int. Cl.
    *G06K 5/00*   (2006.01)
(52) U.S. Cl. .................. 235/380; 705/35; 705/38
(58) Field of Classification Search .......... 235/380, 235/375, 379, 381, 487; 705/35, 38–39
    See application file for complete search history.

(56) References Cited

U.S. PATENT DOCUMENTS

| | | | |
|---|---|---|---|
| 4,718,009 A | 1/1988 | Cuervo | |
| 5,569,897 A | 10/1996 | Masuda | |
| 5,696,908 A | 12/1997 | Muehlberger et al. | |
| 5,724,523 A | 3/1998 | Longfield | |
| 5,743,429 A | 4/1998 | Morofsky | |
| 5,883,452 A | 3/1999 | Masuda | |
| 5,950,179 A | 9/1999 | Buchanan et al. | |
| 6,105,009 A | 8/2000 | Cuervo | |
| 6,144,948 A | 11/2000 | Walker et al. | |
| 6,158,657 A | 12/2000 | Hall et al. | |

(Continued)

OTHER PUBLICATIONS

Datacard Group: Products: Desktop Embossers, Datacard 150i Card Personalization System, http://www.datacard.com/products/p1_06.htm, printed on Sep. 15, 2000.

(Continued)

*Primary Examiner*—Jared J. Fureman
*Assistant Examiner*—Edwyn Labaze
(74) *Attorney, Agent, or Firm*—Finnegan, Henderson, Farabow, Garrett & Dunner, L.L.P.

(57) ABSTRACT

Systems, methods, and apparatus are provided for instant decisioning and remote dispensing of credit cards. In accordance with one implementation the system for instantly issuing a credit card includes means for receiving a credit card application from an applicant, means for instantly decisioning the credit card application, if declined, means for instantly notifying the applicant of that decision, and if approved, means for instantly issuing the credit card. The instant issuance credit card system can also receive a security deposit from the applicant where a determination is made that the applicant may need to remit a security deposit in order to secure the credit card. A decision to require security deposit may be based on the credit history of the applicant. A method for instantly issuing a credit card is also provided. Additionally, an apparatus for remotely dispensing a credit card is provided. The remote dispensing apparatus includes: an input device; a security deposit acceptor; a remote dispensing module, wherein the remote dispensing module communicates with a central real-time decisioning platform; a credit card dispenser; and a display.

22 Claims, 10 Drawing Sheets

U.S. PATENT DOCUMENTS

| | | |
|---|---|---|
| 6,494,365 B1 | 12/2002 | Kozakai et al. |
| 6,659,259 B1 | 12/2003 | Knox et al. |
| 6,817,521 B1 * | 11/2004 | Matada ........................ 235/380 |
| 2003/0182247 A1 | 9/2003 | Mobed et al. |
| 2006/0085340 A1 * | 4/2006 | Hung et al. ................... 705/42 |

OTHER PUBLICATIONS

Datacard Group: Products: Card Production, Datacard Arista Custom Card Printer, http://www.datacard.com/products/artista/default.htm, printed on Sep. 12, 2000.

* cited by examiner

FIG. 10 ously well known and ubiquitous that they have fundamentally changed
SYSTEMS, METHODS, AND APPARATUS FOR INSTANT ISSUANCE OF A CREDIT CARD This is a continuation of application Ser. No. 09/694,791, filed Oct. 24, 2000, now U.S. Pat. No. 6,877,656, which is incorporated herein by reference in its entirety.

BACKGROUND OF THE INVENTION

I. Field of the Invention

The present invention relates generally to systems, methods, and apparatus for issuing credit cards. More particularly, the invention relates to systems, methods, and apparatus for instantly issuing credit cards using a remote dispenser.

II. Background and Related Information

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred.

The spending power of a credit card (i.e., the total amount of funds available to the cardholder at any particular time for making purchases) is typically limited to a particular amount predetermined by the issuer of the card. This amount is commonly referred to as the "credit limit" of the credit card. The size of the issuer-imposed credit limit is generally based on a number of non-exclusive factors, the most important of which are often the cardholder's earning capacity and the cardholder's credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance", while the remaining or available balance of the credit limit is typically called the "available balance" and reflects the dynamically adjusted current spending power of the credit card. The cardholder may increase the available balance up to the credit limit, by paying to the issuer (or its representative) the entire outstanding balance or a fractional portion thereof.

Credit card offers are typically sent to potential customers via regular mail. The issuer of a credit card may offer potential customers a particular credit card by disclosing the terms and conditions of the credit card product (e.g., annual fees, interest rate(s) and finance charges, etc.) and the credit limit of the credit card that may reach a stated maximum upon qualification. When a credit card application is returned by a customer, the amount of the credit limit is generally determined by the issuer based on various factors, such as the customer's credit history and earning capacity.

This traditional strategy for issuing credit cards, however, does not work effectively for a large segment of U.S. households that are either self-banked or un-banked. Self-banked households are those households that rely on non-bank institutions, such as check cashing outlets (CCOs), pawnshops, payday loan outlets, and rent-to-own stores. Un-banked households are those households that lack any formal relationship with a bank. Traditional approaches for offering credit cards to these households do not work for several reasons, for example, secured credit cards offered by mail have a very low response rate from this segment. At the same time, however, non-secured credit cards are not a good option for this segment, because of the high percentage of charge offs in this segment.

In view of the inability to effectively serve the self-banked and un-banked households there is a need for systems, methods, and apparatus for offering credit cards to this segment without undue high risks to the institution offering such credit cards.

SUMMARY OF THE INVENTION

Systems, methods, and apparatus consistent with the present invention provide instant issuance of credit cards using a remote dispenser. Specifically, in accordance with the principles of the present invention, a system is provided for instantly issuing a credit card, which includes means for receiving a credit card application from an applicant, means for instantly decisioning the credit card application, and if declined, means for instantly notifying the applicant of that decision, and if approved, means for instantly issuing the credit card. The instant issuance credit card system can also receive a security deposit from the applicant where a determination is made that the applicant may need to remit a security deposit in order to secure the credit card. A decision to require security deposit may be based on the credit history of the applicant.

Additionally, an apparatus for remotely dispensing a credit card is provided. The remote dispensing apparatus includes: an input device; a security deposit acceptor; a remote dispensing module, wherein the remote dispensing module communicates with a central real-time decisioning platform; a credit card dispenser; and a display.

Also, in accordance with the present invention, a method for instantly issuing a credit card is provided. The method is implemented in a system having a decisioning system, which may be centrally located, and a remote dispensing apparatus. The method includes the step of receiving a credit card application from an applicant. Next, the credit card application is instantly decisioned, i.e., a decision is made based on factors, such as the credit history of the applicant, to either decline the credit card application or approve the credit card application. If the credit card application is declined then the applicant is accordingly notified. If, however, the credit card application is approved then the credit card is dispensed using the remote dispensing apparatus.

BRIEF DESCRIPTION OF THE DRAWINGS

The accompanying drawings, which are incorporated in and constitute a part of this specification, illustrate the various features and aspects of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described herein without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

According to the invention, systems, methods, and apparatus are provided for instantly issuing credit cards using a remote dispenser. The present invention is advantageous over past approaches in that it permits instant decisioning and remote dispensing of credit cards. One skilled in the art will appreciate that instant decisioning may be referred to as real-time decisioning. Such real time decisioning coupled with remote dispensing of credit cards permits the present invention to deliver a credit card to a customer instantly, after a customer applies for the credit card and is approved. One skilled in the art will appreciate that the term instant decisioning means that a credit card is dispensed as soon as the credit card application is processed and the credit card is embossed. Thus, based on the state of the art in communication, processing, and embossing technologies instant decisioning and delivery of a credit card may take anywhere from a few seconds to a few minutes.

The customer may apply for the credit card using a remote dispenser, which may have a user interface permitting the customer to apply for the credit card and receive a credit card upon instant decisioning. The customer may also apply for a credit card with the help of a telesales agent, who may assist the customer in inputting the relevant information to the decisioning system associated with the present invention.

Figure 1:
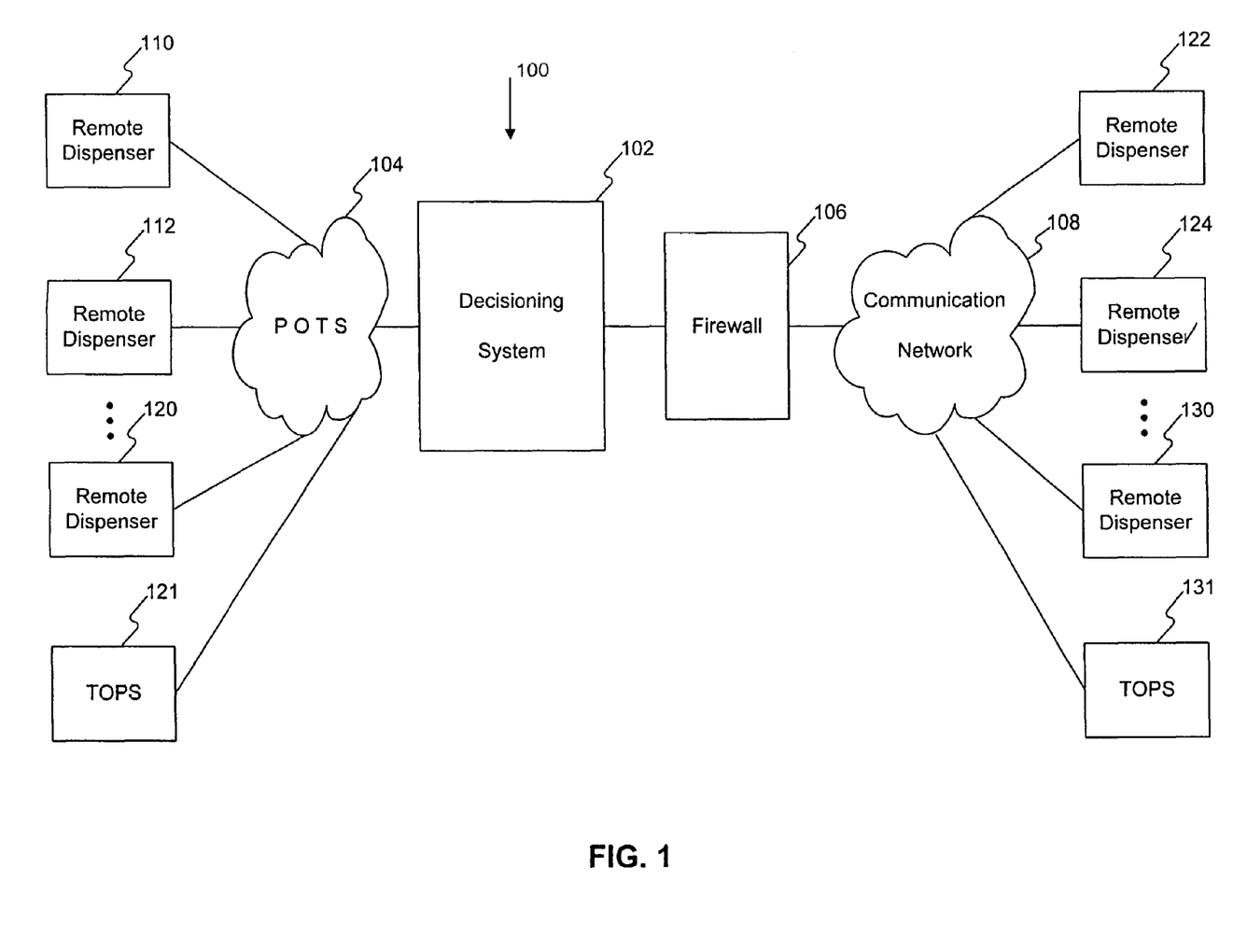
FIG. 1 illustrates an exemplary system environment in which the features of the present invention may be implemented.

By way of a non-limiting example, FIG. 1 illustrates a system environment 100 in which the features and principles of the present invention may be implemented. As illustrated in the block diagram of FIG. 1, system environment 100 includes a decisioning system 102, a plain old telephone system (POTS) network 104, a firewall 106, a communication network 108, one or more remote dispensers 110, 112 . . . 120, which are connected to POTS 104, and one or more remote dispensers 122, 124 . . . 130, which are connected to communications network 108. Remote dispensers 110, 112 . . . 120 and 122, 124 . . . 130 provide similar functionality, except that they have different communication interface. Thus, for example, remote dispenser 110 is connected to POTS 104 via a modem, whereas remote dispenser 122 may be connected to communication network 108 via a network interface adapter, such as an Ethernet adapter. Firewall 106 protects the resources and information stored in decisioning system 102. In addition encryption techniques may also be used to ensure secure communication of data and comply with the industry requirements for security of credit card data.

In addition, in an alternative embodiment of the present invention, a credit card applicant may apply for a credit card with the help of a telesales agent. The telesales agent may use TOPS modules 121 and 131, as depicted in FIG. 1. TOPS modules 121 and 131 are used for data entry related to a credit card application. In this alternative embodiment, instead of entering credit card application data herself, the applicant provides the relevant information to the telesales agent, who then uses the TOPS module to enter the relevant data. Upon instant decisioning, if a credit card is approved, the credit card is printed using a remote dispenser, including an embossing machine. The TOPS modules are software components installed on a computing platform, for example, a conventional personal computer. The TOPS modules are connected to the rest of the system in a similar manner as the remote dispensers. Thus, for example, TOPS module 121 may be connected to decisioning system 102 via POTS 104. In this instance, the computing platform having the TOPS module has, for example, a modem permitting the TOPS module to communicate with the decisioning system. The TOPS modules are also connected with the remote dispensers such that a credit card may be embossed at the remote site. One skilled in the art will appreciate that the TOPS modules 121 and 131 are merely exemplary and one may have thousands of such modules installed on conventional personal computers or on network terminals. In addition, such terminals may accept smart cards and access computing abilities over the communication network.

In the embodiment of FIG. 1, communications network 108 may comprise, alone or in any suitable combination, a local area network (LAN), a wide area network (WAN), a dedicated Intranet, and/or the Internet. Furthermore, any suitable combination of wired and/or wireless components and systems may be incorporated into communications network 108. In addition, POTS network 104 may include PBXes or other telephony devices.

Figure 2:
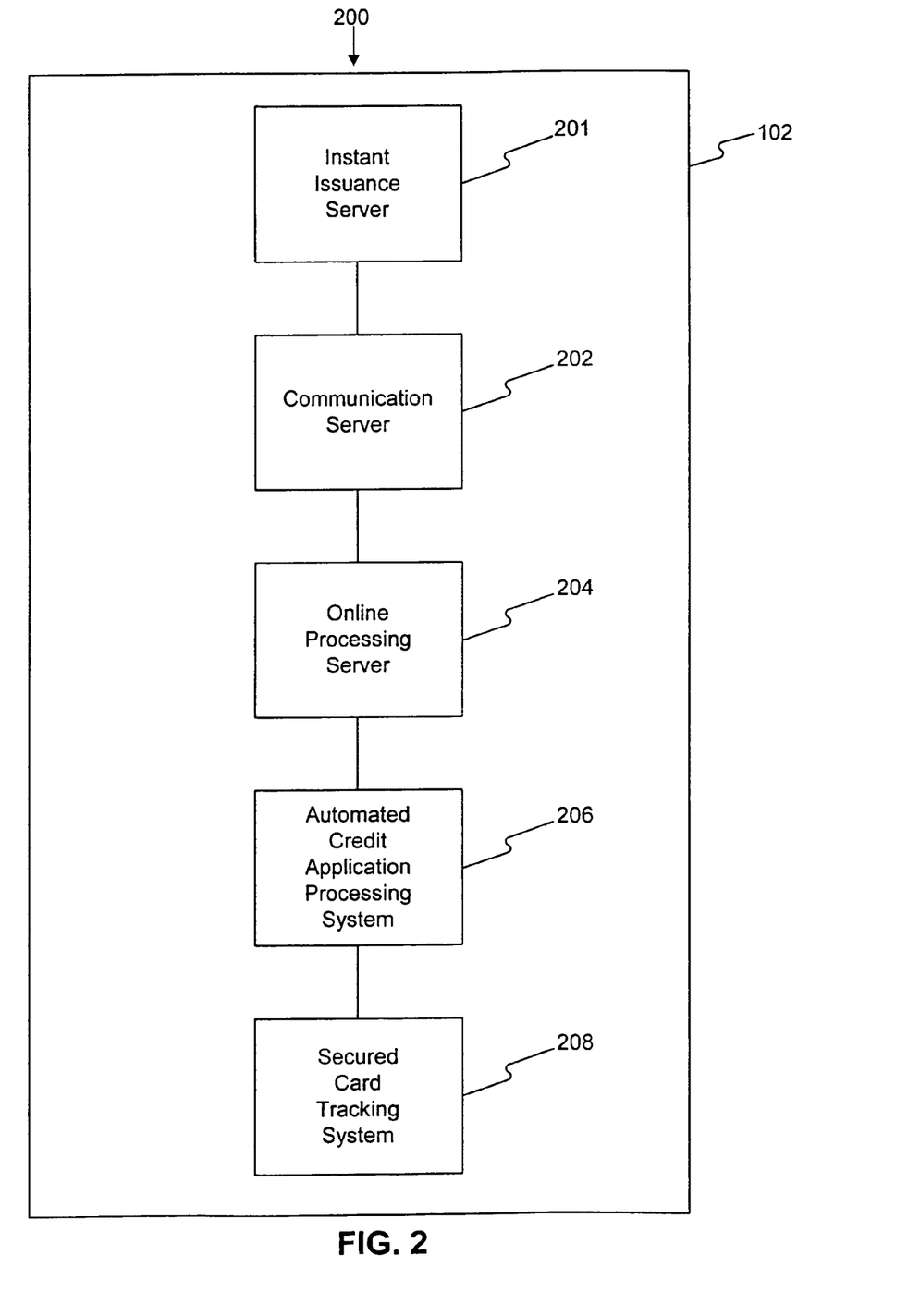
FIG. 2 depicts an exemplary decisioning system, consistent with the present invention.

FIG. 2 depicts an exemplary implementation of a decisioning system 200, consistent with the present invention. As shown in FIG. 2, decisioning system 200 may include an instant issuance server 201, a communications server 202, an online processing server 204, an automated credit application processing system 206, and a secured card tracking system 208. Instant issuance server 201 interacts with the other components of the decisioning system to instantly issue a credit card. Communications server 202 handles communication with the instant issuance server and other components of the present invention. Online processing server 204 implements real time online decisioning ability in conjunction with automated credit application processing ("ACAP") system 206. Secured card tracking ("SCT") system 208 maintains security deposit information and thus helps implement secured credit card issuance. Each of these systems/servers may have programs that when executed by a processor operatively connected to a memory, provide the functionality associated with these servers or systems.

One skilled in the art will appreciate that although FIG. 2 depicts separate systems and servers, the functionality associated with each of these servers or systems may be combined into one server or system. Conversely, the functionality associated with these servers/systems may be further sub-divided into other components according to the needs of the system, for example, communications server 202 may comprise of two servers: (1) an HTTP server for interface with browsers, such as Netscape, and (2) a conventional mainframe server for interface with terminals running communication protocols, such as TN3270 from IBM. Further, although these components are depicted as being located at the same place, the components of FIG. 2 may be distributed on networked computers, which are connected via a communication network.

Additionally, although aspects of the present invention are generally described as being stored in memory, one skilled in the art will appreciate that these aspects may be stored on or read from various computer-readable media, such as secondary storage devices, like hard disks, floppy disks, and CD-ROM; a carrier wave received from a network like the Internet; or other forms of ROM or RAM. Additionally, although specific components and programs of the systems are depicted in FIG. 2, one skilled in the art will appreciate that these may contain additional or different components or programs.

Figure 3:
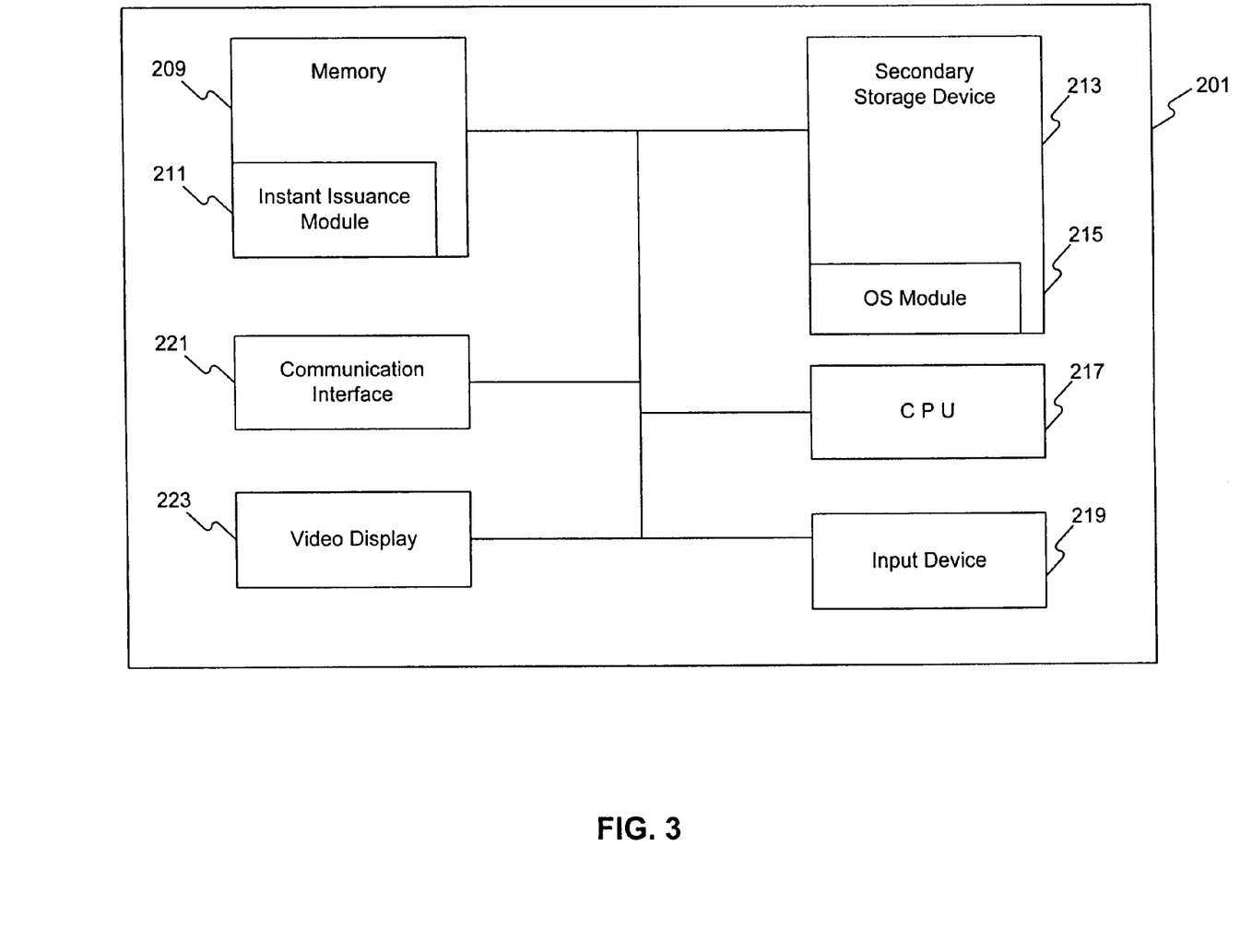
FIG. 3 depicts an instant issuance server consistent with the present invention.

FIG. 3 depicts an implementation of an instant issuance server 201. Instant issuance server 201 includes a memory 209, a secondary storage device 213, a CPU 217, an input device 219, a communication interface 221, and a video display 223. Memory 209 includes an instant issuance module 211, which works in conjunction with other components of the server to handle instant issuance of credit cards via the remote dispensers. Thus, for example, the instant issuance module includes functionality to interact with other servers and sub-systems, for example, the ACAP system via the communications server. In one implementation, the instant issuance server creates an embossing record related to the customer for whom a credit card has been approved. The instant issuance server then sends the embossing record to the remote dispenser used by the customer to request a credit card. As part of this process, the instant issuance server can also suppress the printing of a credit card at the central location, such that duplicate credit cards are not created.

In one implementation, the instant issuance module may be implemented using the server component of the Enterprise Card Wizard, which is available from Dynamic Solutions Intl. of Colorado. Secondary storage device 213 includes an OS module 215. OS module 215 may be a Unix operating system module, or a Windows NT module or any other comparable software module. In addition, the functionality associated with the OS module and the communication module may implemented using a distributed object oriented computing environment, for example, Java® or Jini®.

Instant issuance server 201 may also include functionality associated with fault detection and management. Specifically, for example, the instant issuance server may track the status of other components of the decisioning system and the remote dispensers. Thus, for example, in a situation where the remote dispenser has a defective embosser, the instant issuance server may emboss a credit card via conventional embossing process, i.e., centrally and then the credit card may be mailed to the customer at a later time. In addition, it may generate errors and alarms related to failures in the system. One skilled in the art will appreciate that the instant issuance server may also re-route traffic in an implementation of the system where, for example, several ACAP systems are being used to serve a multitude of remote dispensers 110, 112 . . . 120 and 122, 124 . . . 130. In addition, multiple instant issuance servers may collaborate among each other to provide the instant issuance functionality.

Figure 4:
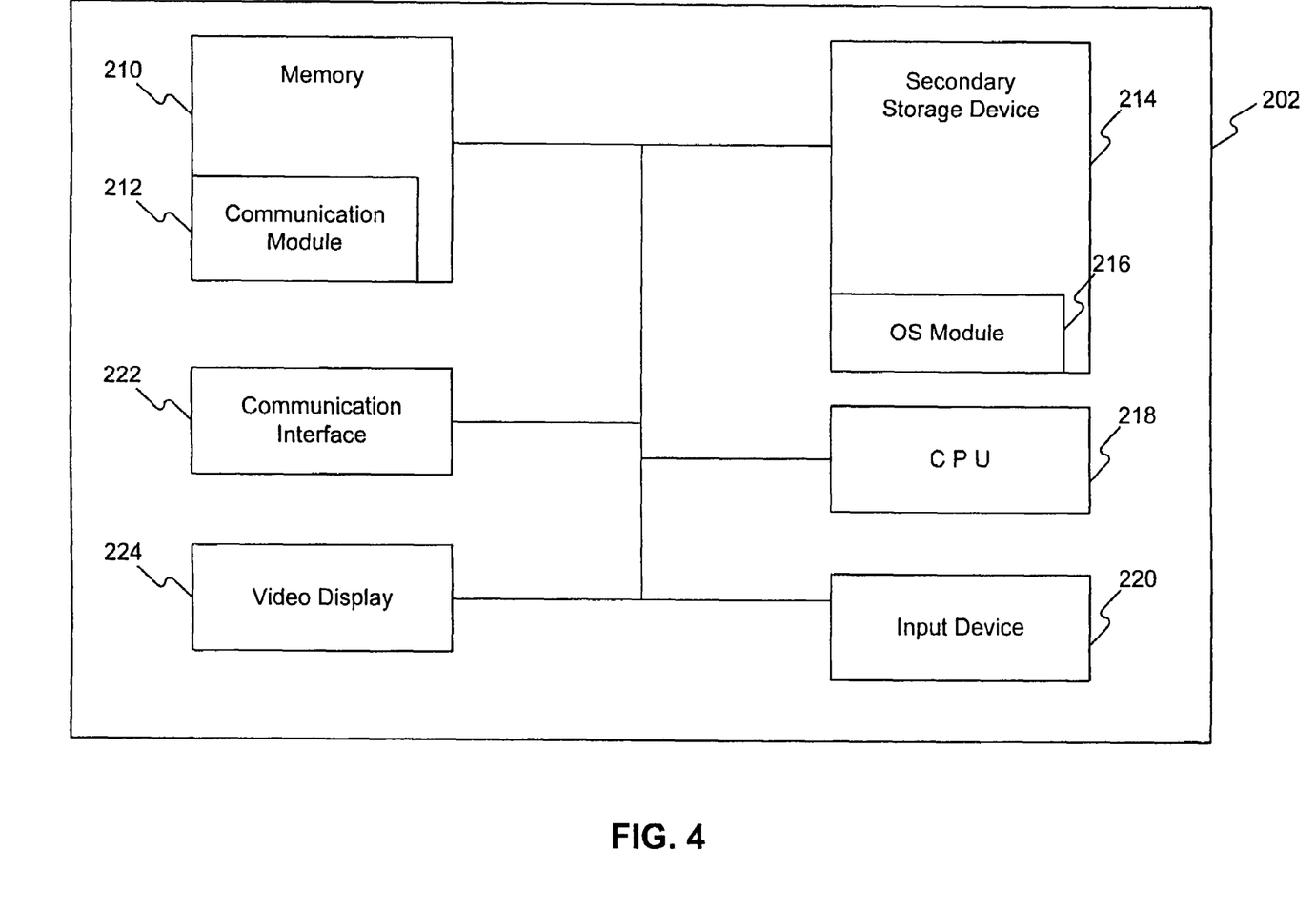
FIG. 4 depicts a communications server consistent with the present invention.
Figure 5:
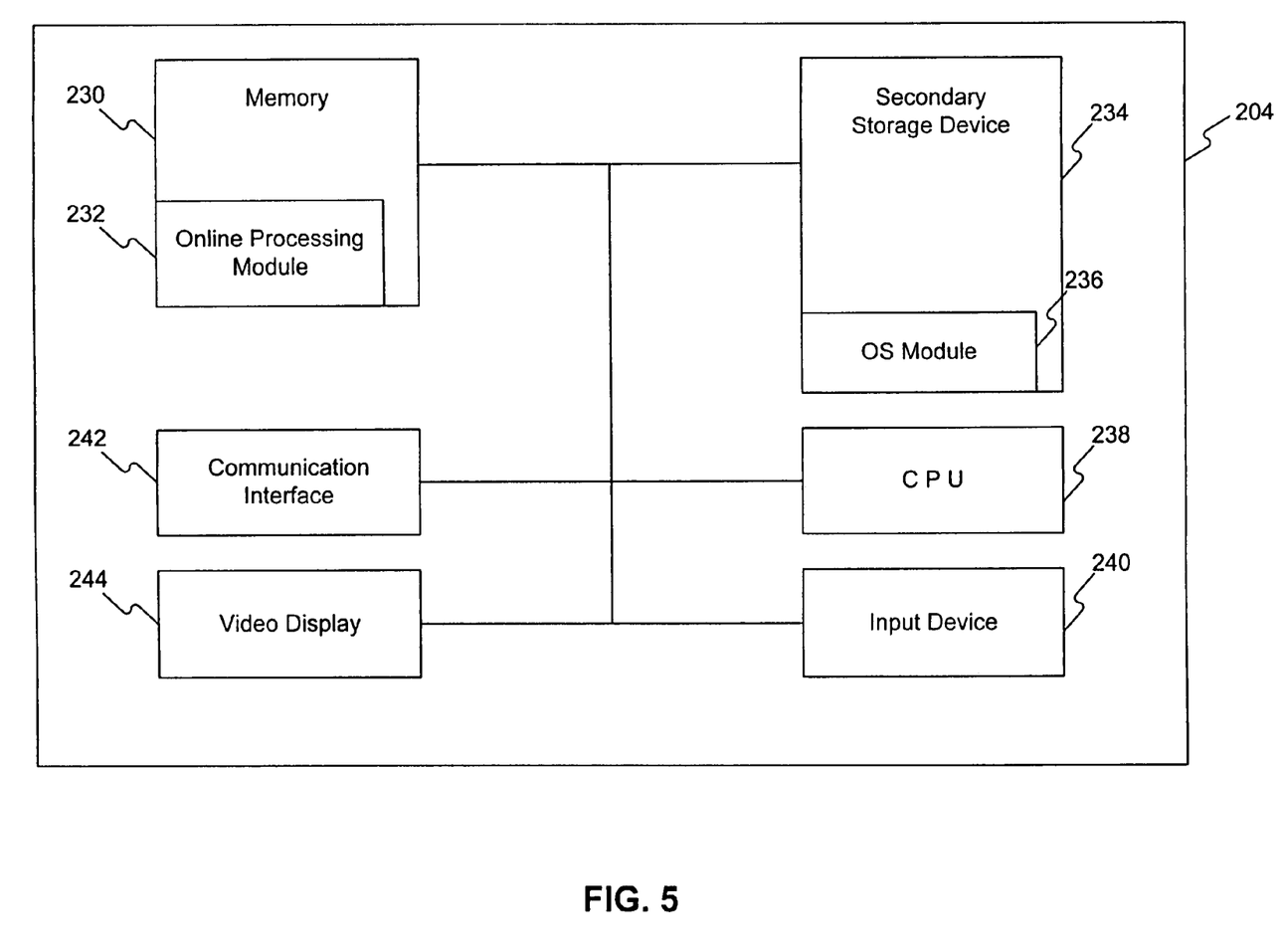
FIG. 5 depicts an online processing server consistent with the present invention.

FIG. 4 depicts an implementation of a communications server 202. Communications server 202 includes a memory 210, a secondary storage device 214, a CPU 218, an input device 220, a communication interface 222, and a video display 224. Memory 210 includes a communication module 212, which works in conjunction with other components of the server to handle communications with the instant issuance server and other servers and systems. Communication module 212 may include, for example, the remote procedure call library and programs from Sun Microsystems®, Inc. Communication module 212 also includes functionality to interact with other servers and sub-systems, for example, the ACAP system. This functionality may permit the communication server, for example, to provide both asynchronous and synchronous communication among various front-end and back-end systems and applications. Thus, for example, communication module 212 permits synchronous messaging between the front-end agent application and the multiple back-end systems, using the remote procedure call library and programs from Sun Microsystems®, Inc. Communication module 212 also permits synchronous messaging, for example, transmitting queries from the online server to the appropriate back-end system, such as the ACAP system. In one implementation, this functionality may be realized by using a MQseries client/server solution from IBM Corporation of Armonk, N.Y. Secondary storage device 214 includes an OS module 216. OS module 216 may be a Unix operating system module, or a Windows NT module or any other equivalent software module. In addition, the functionality associated with the OS module and the communication module may implemented using a distributed object oriented platform, for example, Java® or Jini®. FIG. 5 depicts an implementation of an online processing server 204. Online processing server 202 includes a memory 230, a secondary storage device 234, a CPU 238, an input device 240, a communication interface 242, and a video display 244. Memory 230 includes an online processing module 232, which works in conjunction with other components of the server to handle online processing.

Figure 6:
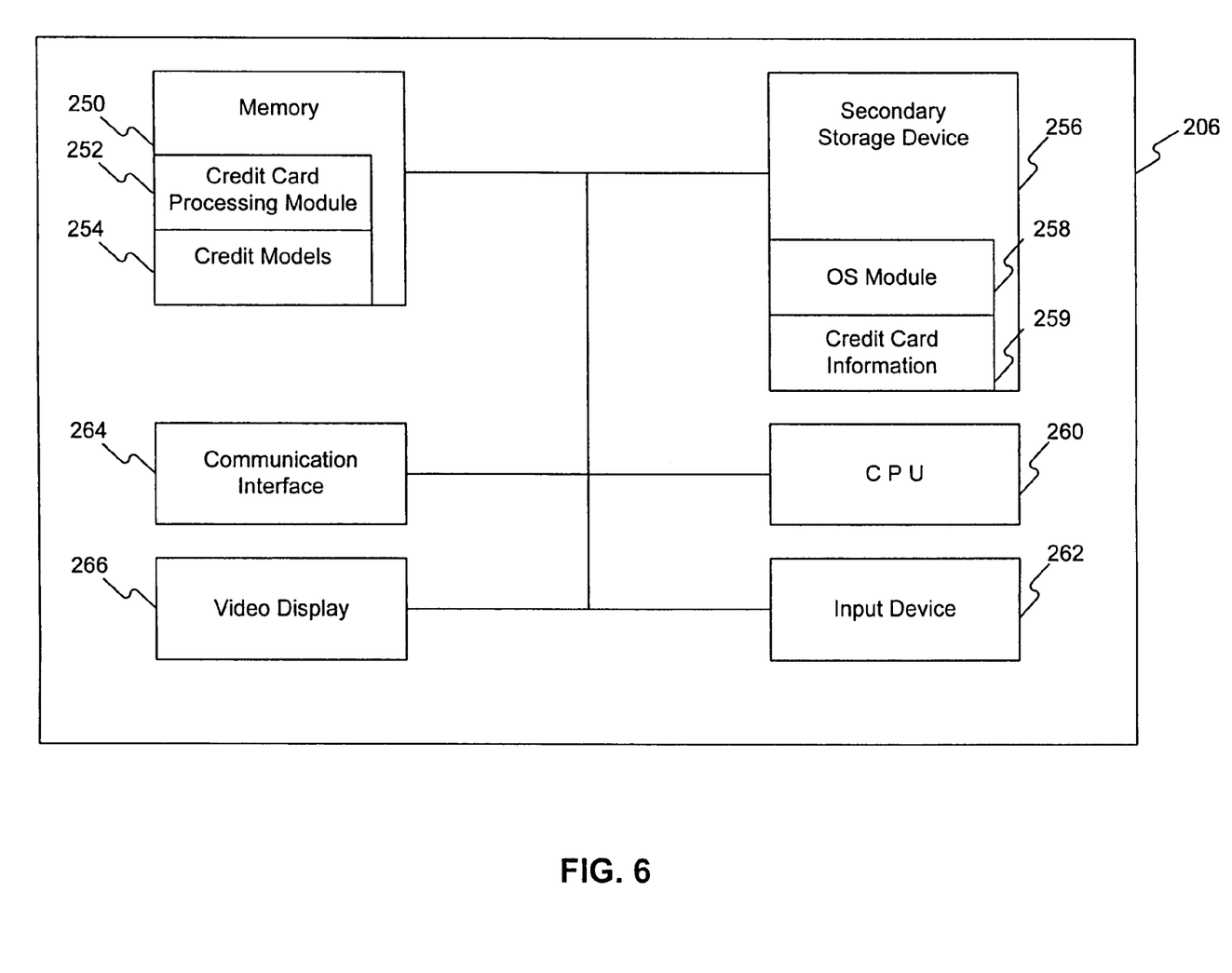
FIG. 6 depicts an automated credit application processing system consistent with the present invention.

FIG. 6 depicts an implementation of an automated credit application processing ("ACAP") system 206. ACAP system 206 includes a memory 250, a secondary storage device 256, a CPU 260, an input device 262, a communication interface 264, and a video display 266. Memory 250 includes a credit card processing module 252, which works in conjunction with credit models 254 to process credit card applications. The ACAP system takes application and credit bureau information and processes it through credit models to determine eligibility for the credit card product provided. One skilled in the art will appreciate that the ACAP system may store the credit bureau information locally, or it may obtain this information from the credit bureaus' using, for example, a communication link with the bureaus.

Secondary storage device 256 includes an OS module 258 and credit card information 259. OS module 258 may be a Unix operating system module, or a Windows NT module or any other equivalent software module, for example, a Java® module. Credit card information 259 includes data related to individual credit card holders and other credit related information, for example, credit reports related to existing credit card customers. One skilled in the art will appreciate that credit card information 259 may include other relevant information as well. Credit card processing module 252 may access the credit card information as needed during processing a credit card application. It may also store credit card information in the secondary storage for future access and manipulation. In one implementation, the functionality associated with the credit card processing module may be implemented using the ACAPS enterprise wide solution available from American Management Systems, Inc. of Fairfax, Va.

Figure 7:
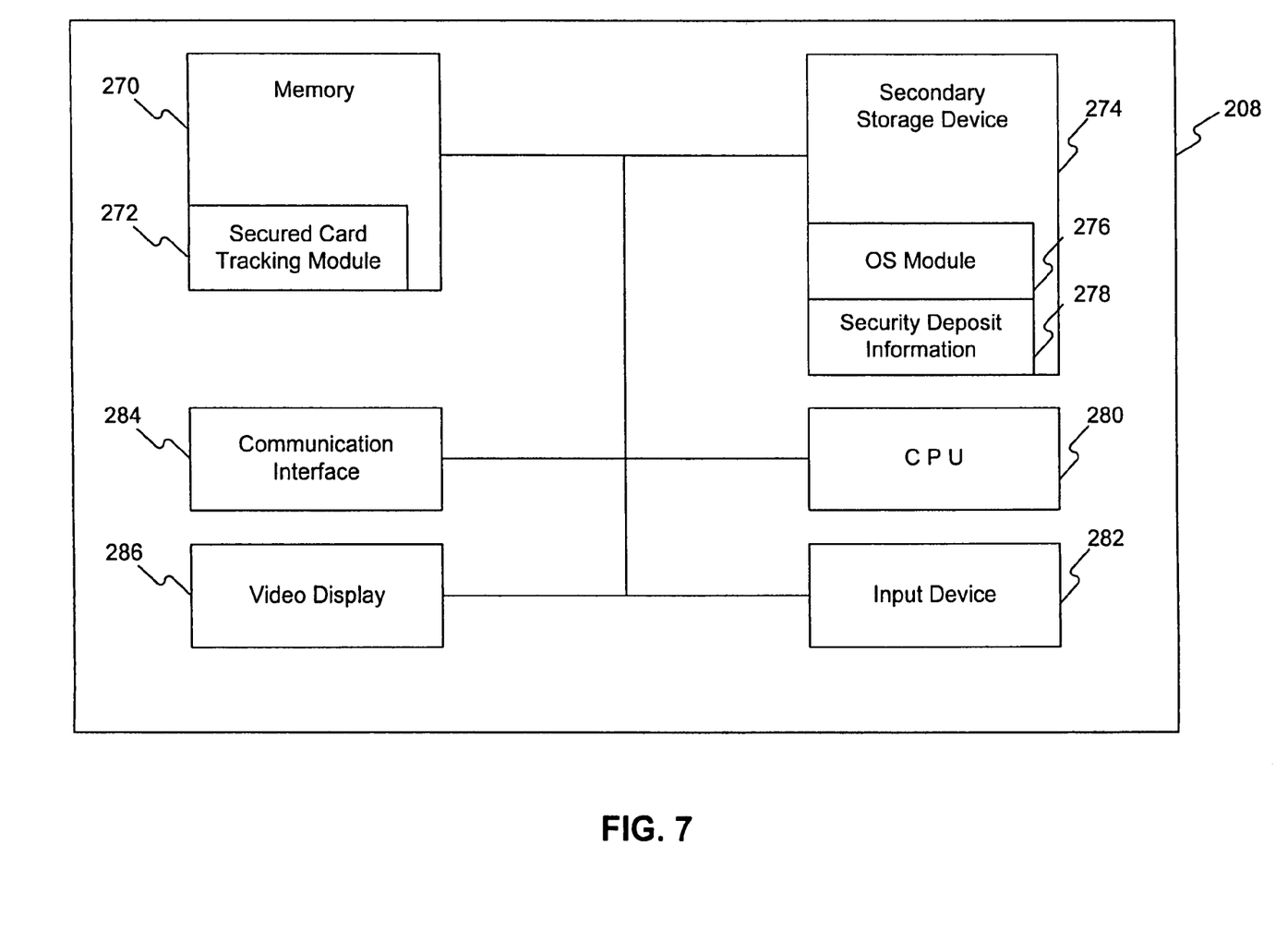
FIG. 7 depicts a secured card tracking system consistent with the present invention.

FIG. 7 depicts an implementation of a secured card tracking ("SCT") system 208. SCT system 208 includes a memory 270, a secondary storage device 274, a CPU 280, an input device 282, a communication interface 284, and a video display 286. Memory 270 includes a secured card tracking module 272. The secured card tracking module updates and keeps track of security deposit information 278, which is stored in secondary storage device 274. Secondary storage device 274 also includes an OS module 276. OS module 258 may be a Unix operating system module, or a Windows NT module or any other equivalent software module, for example, a Java® module.

Figure 8:
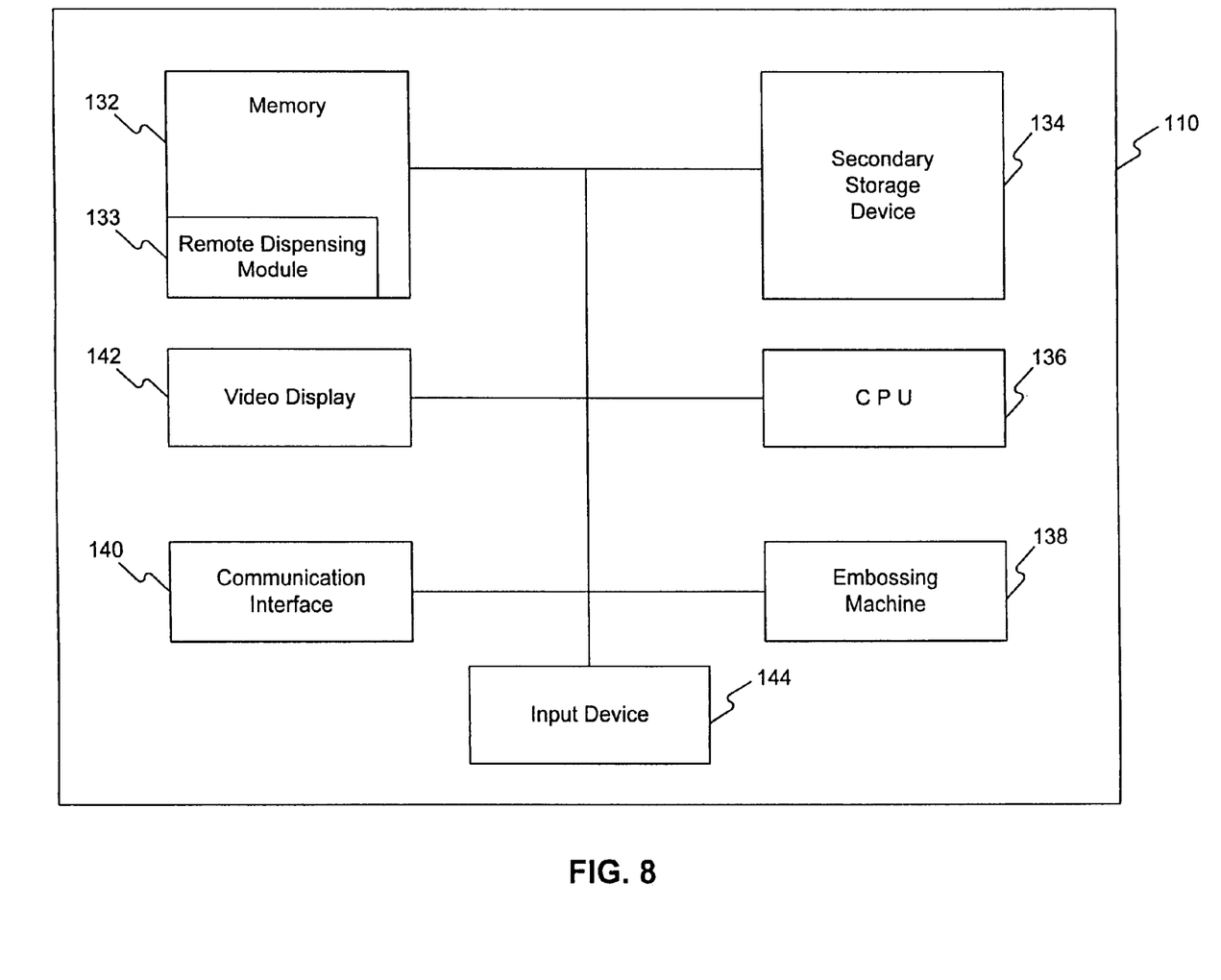
FIG. 8 depicts an implementation of a remote dispenser consistent with the present invention.

FIG. 8 depicts an implementation of a remote dispenser, such as remote dispenser 110 shown in FIG. 1, consistent with the present invention. Remote dispenser 110 includes a memory 132, a secondary storage device 134, a CPU 136, an embossing machine 138, a communication interface 140, a video display 142, and an input device 144. Memory 132 includes a remote dispensing module 133. The remote dispensing module 133 interacts with both the instant issuance module located on instant issuance server 201 and embossing machine 138. Thus, for example, the remote dispensing module 133 receives an embossing record corresponding to a credit card from the instant issuance server and sends the record to embossing machine 138. The embossing machine 138 then embosses the relevant credit card information onto a card, for example, a plastic card in accordance with Visa®, MasterCard® and/or the system operator's embossing standards. One skilled in the art will appreciate that the embossed information includes the name of the credit card holder, the credit card number, and the date of expiration of the credit card. The embossing machine 138 also writes encoded customer information on the magnetic stripe on the back of the card.

The remote dispensing module may also communicate error messages to the instant issuance server, for example, where the embossing machine reports a malfunction to the remote dispensing module. This functionality is also important to reconcile the number of credit cards dispensed with the number of embossing records created. Thus, for example, where the embossing machine situated at the remote location fails to generate a credit card, the central location needs that information in order to produce a credit card centrally.

The functionality encapsulated in the remote dispensing module may be implemented using the client component of the Enterprise Card Wizard, which is available from Dynamic Solutions Intl., of Colorado. An embossing machine 138 consistent with the present invention may be implemented using an embosser, for example, the Datacard 150*i* available from the Datacard Group of Minnetonka, Minn. Communication interface 140 may be an Ethernet adapter, an RF adapter, a modem, or any other communication interface permitting the remote dispenser to communicate with the decisioning system and other components of the present invention. Input device 144 may be a keyboard, a mouse, or any other device permitting input of commands or information from a customer or user into the remote dispenser. The card may be activated via a VRU (voice Response Unit) through a telephone by the customer at a later time.

Figure 9:
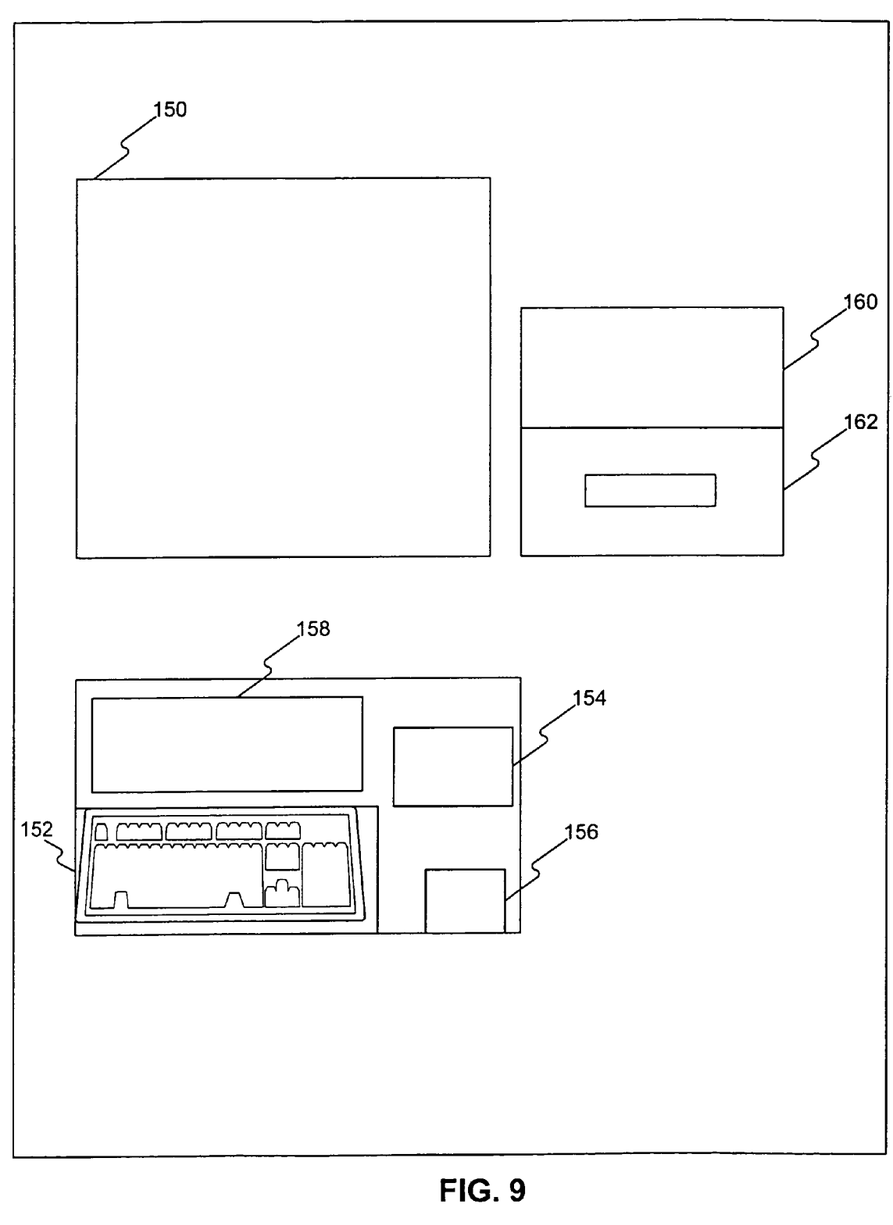
FIG. 9 depicts a user interface for the remote dispenser consistent with the present invention.

FIG. 9 depicts a user interface for one implementation of a remote dispenser 110 consistent with the present invention. The user interface for the remote dispenser 110 includes a display 150, a keypad 152, a bill acceptor 154, a card acceptor 156, a credit card information dispenser 160, and a credit card dispenser 162. The user interface for the remote dispenser 110 permits a customer to apply for a credit card and receive a credit card if a credit card is approved. Thus, for example, the customer may, by using keypad 152, request a credit card and follow the information displayed on display 150 to complete the request for the credit card. During the credit card application process, the customer may be required to provide a security deposit in order to issue a secured credit card. The customer may remit the required amount by inserting currency bills through bill acceptor 154. Alternatively, the customer may use an ATM card to transfer the required amount from her bank account to the credit card decisioning system. One skilled in the art will appreciate that the customer may also use any other card, for example, a smart card or a memory stick or any other device for transferring money from his account to the operator/owner of the instant credit card decisioning system. The customer may also write a check, which may then be read by a check reader 158.

After the customer has completed the credit card application process, including remitting the required security deposit, the system then delivers a credit card to the customer through the credit card dispenser 162, which is embossed using the embossing machine contained in the remote dispenser. The system may also deliver relevant credit card disclosures to the customer via credit card information dispenser 160. Such credit card information may be printed or may be dispensed through other means.

In another implementation of the remote dispenser consistent with the present invention, a customer applies for a credit card using a telesales agent. In this implementation, the remote dispenser user interface need not support security deposit acceptance features. Thus, for example, in this implementation the remote dispenser may only have a display and a credit card dispenser.

One skilled in the art will appreciate that the components and the user interface elements associated with the remote dispenser may be distributed. Thus, for example, the embossing machine may not be located in the same kiosk or housing as the rest of the components. Indeed, the embossing machine may be located in a secure place, for example, a part of the remote location, such as a check cashing outlet that has limited access.

In accordance with the principles of the present invention, an exemplary process for instantly issuing a credit card will now be described with reference to FIG. 10.

Figure 10:
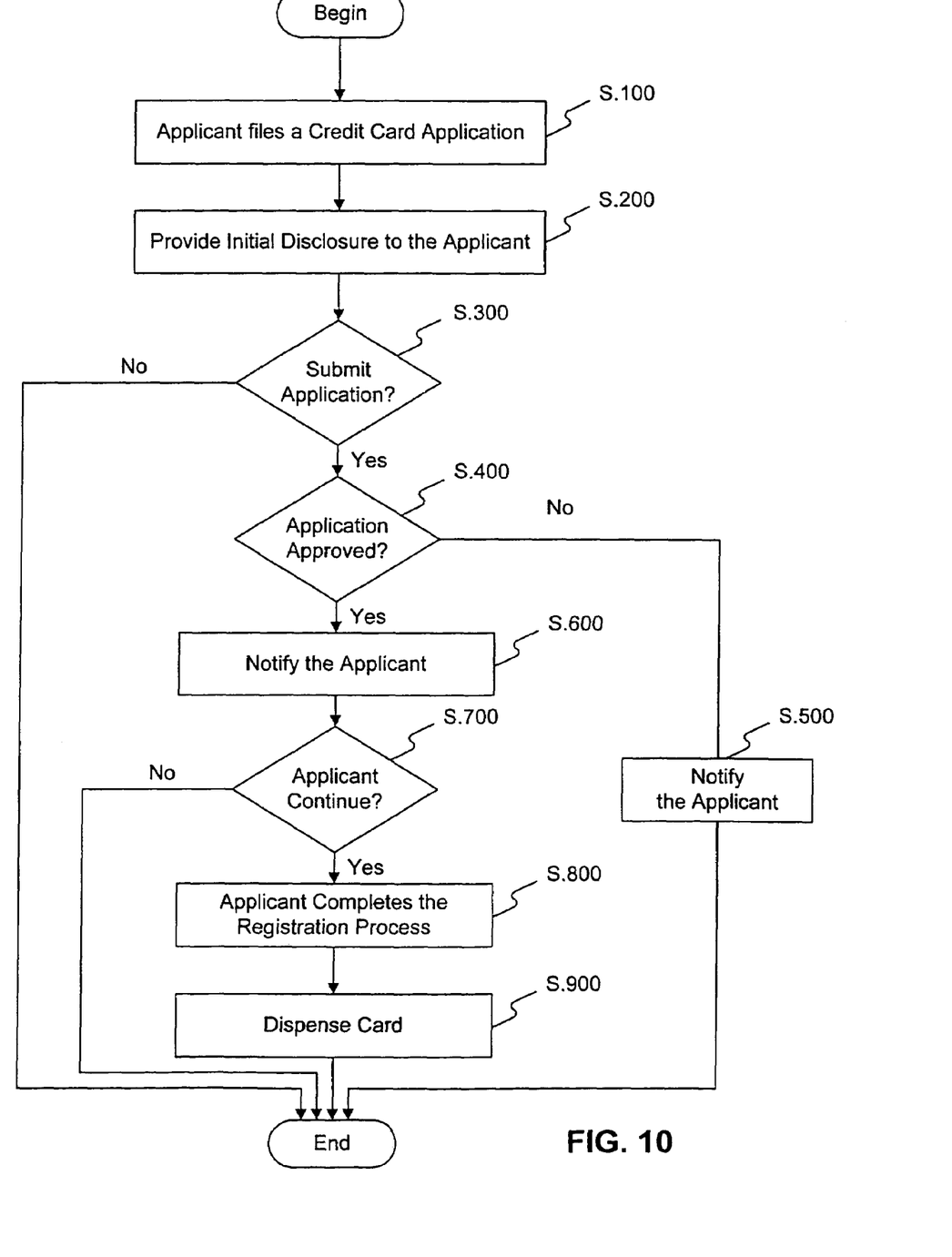
FIG. 10 depicts an exemplary flow chart of a process for instantly issuing a credit card, consistent with the present invention.

As shown in FIG. 10, the first step is performed when an applicant files a credit card application (step S.100). The applicant may file this application using the remote dispenser's user interface and associated keypad as shown in FIG. 8, or the applicant may file this application by using a telephone with the help of a telesales agent. The system then provides initial disclosure to the applicant (step S.200). This disclosure may be provided by displaying the relevant disclosure on the display associated with the remote dispenser or may be provided over the telephone by the telesales agent.

Upon receiving the initial disclosure, the system or the telesales agent prompts the applicant to determine whether the applicant wants to submit the application (step S.300). If the applicant decides not to submit the application, then the processing ends. If, however, the applicant decides to submit the credit card application, then the processing continues to the next step.

The submitted application is then processed and is approved or disapproved (step S.400). In this step, the online processing system and the ACAP system (FIGS. 2, 5, and 6) may interact to arrive at a decision. Specifically, for example, during this step credit card processing module 252 may analyze the information contained in the submitted credit card application in view of credit models 254. One skilled in the art will appreciate that this step also involves accessing credit reports associated with the applicant from the credit bureaus (not shown) and analyzing them to determine the type of offer and the credit limit associated with the offer. For example, the ACAP system may decide to offer a secured credit card with a low credit limit for an applicant, who has a bad credit history.

If the application is not approved then the applicant is notified either by displaying a message on the remote dispenser's screen or by indicating to the applicant over the telephone (step S.500), and the processing ends. If, however, the application is approved then the applicant is notified of the approval (step S.600) and the processing continues to the next step.

Next, the applicant is asked whether the applicant wants to continue (step S.700). This step permits the applicant to decide whether he or she wants to take the offered credit card deal or decline it. If the applicant decides to discontinue the process, then the processing ends. Otherwise the processing continues and the applicant completes the registration process (S.800). This process may involve verification of applicant's identification. This verification may be done by a human agent or via other means, for example, including biometric means. Also, this step may require the applicant to remit a certain deposit amount, where the applicant was offered a secured credit card. One skilled in the art will appreciate that the credit limit on the secured card need not be the same as the remitted deposit amount. The credit limit, however, could be related to the deposit amount.

Upon the completion of the registration the system dispenses the credit card to the applicant (step S.900). This step involves receiving an embossing record from the decisioning system and then embossing the relevant information on the credit card. This step may also involve initializing the magnetic strip on the back of the credit card. One skilled in the art will appreciate that this step may also involve customizing the credit card, for example, printing a photograph of the applicant on the face of the card, if the applicant so desires. Such a photograph may be obtained by the remote dispenser using a digital camera, for example.

One skilled in the art will appreciate that the steps depicted in FIG. 10 may be performed in a different order. In addition, each of these steps may involve additional housekeeping steps not shown.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software, but the present invention may be implemented as a combination of hardware and software or in hardware alone.

What is claimed is:

1. A method for dispensing a credit card to an applicant at a remote location, the method comprising:
   providing a security deposit receiver and a credit card dispenser at a remote location;
   receiving information relevant to the applicant's credit-worthiness;
   determining, based on the received information, whether the applicant will be required to provide a security deposit in order to secure the credit card; and
   if it is determined that the applicant will be required to provide a security deposit:
   receiving a security deposit, at the remote location, using the security deposit receiver; and
   dispensing the credit card, at the remote location, using the credit card dispenser.

2. The method of claim 1, wherein providing the security deposit receiver and a credit card dispenser at the remote location comprises:
   providing a remote dispenser at the remote location, the remote dispenser including the security deposit receiver and the credit card dispenser.

3. The method of claim 1, further comprising:
   providing a central decisioning platform in communication with the security deposit receiver and the credit card dispenser, the central decisioning platform receiving the information relevant to the applicant's credit-worthiness and determining, based on the information, whether the applicant will be required to provide a security deposit in order to secure the credit card.

4. The method of claim 3, wherein dispensing the credit card comprises the credit card dispenser receiving a record from the central decisioning platform, the credit card dispenser placing information contained in the record on the credit card.

5. The method of claim 4, wherein placing information contained in the record on the credit card comprises at least one of: (a) the credit card dispenser embossing the credit card in accordance with the record, or (b) the credit card dispenser initializing a magnetic strip on the credit card in accordance with the record.

6. The method of claim 1, wherein receiving a security deposit comprises the security deposit receiver accepting at least one of:
   (a) currency;
   (b) a device for transferring money from a bank account; or
   (c) a check.

7. The method of claim 1, wherein dispensing the credit card comprises at least one of: (a) the credit card dispenser embossing the credit card, or (b) the credit card dispenser initializing a magnetic strip on the credit card.

8. The method of claim 1, wherein dispensing the credit card comprises dispensing the credit card after the security deposit has been received.

9. A system for dispensing a credit card to an applicant at a remote location, the system comprising:
   a decisioning platform for receiving information relevant to the applicant's credit-worthiness and for determining, based on the received information, whether the applicant will be required to provide a security deposit in order to secure the credit card;
   a security deposit receiver for receiving a security deposit, at the remote location, if it is determined that the applicant will be required to provide a security deposit; and a credit card dispenser for dispensing the credit card, at the remote location.

10. The system of claim 9, wherein the decisioning platform includes a communication interface for communicating with the security deposit receiver and the credit card dispenser.

11. The system of claim 10, wherein the credit card dispenser comprises:
   a receiver for receiving a record from the decisioning platform; and
   a mechanism for placing information contained in the record on the credit card.

12. The system of claim 11, wherein the mechanism comprises at least one of: (a) an embosser for embossing the credit card in accordance with the record, or (b) a device for initializing a magnetic strip on the credit card in accordance with the record.

13. The system of claim 9, wherein the security deposit receiver accepts at least one of:
   (a) currency;
   (b) a device for transferring money from a bank account; or
   (c) a check.

14. The system of claim 9, wherein the credit card dispenser comprises at least one of: (a) an embosser for embossing the credit card, or (b) a device for initializing a magnetic strip on the credit card.

15. The system of claim 9, wherein the credit card dispenser dispenses the credit card after the security deposit, if required, has been received.

16. A system for dispensing a credit card to an applicant at a remote location, the system comprising:
   decisioning means for receiving information relevant to the applicant's credit-worthiness and for determining, based on the received information, whether the applicant will be required to provide a security deposit in order to secure the credit card;
   means for receiving a security deposit, at the remote location, if it is determined that the applicant will be required to provide a security deposit; and
   means for dispensing the credit card, at the remote location.

17. The system of claim 16, wherein the decisioning means includes means for communicating with the means for receiving a security deposit and the means for dispensing the credit card.

18. The system of claim 17, wherein the means for dispensing the credit card comprises:
   means for receiving a record from the decisioning means; and
   means for placing information contained in the record on the credit card.

19. The system of claim 18, wherein the means for placing information comprises at least one of: (a) means for embossing the credit card in accordance with the record, or (b) means for initializing a magnetic strip on the credit card in accordance with the record.

20. The system of claim 16, wherein the means for receiving the security deposit accepts at least one of:
   (a) currency;
   (b) a device for transferring money from a bank account; or
   (c) a check.

21. The system of claim 16, wherein the means for dispensing the credit card comprises at least one of: (a) means for embossing the credit card, or (b) means for initializing a magnetic strip on the credit card.

22. The system of claim 16, wherein the means for dispensing the credit card comprises means for dispensing the credit card after the security deposit, if required, has been received.

* * * * *